(12) United States Patent
Namikoshi

(10) Patent No.: US 11,644,826 B2
(45) Date of Patent: May 9, 2023

(54) ROBOT CONTROL APPARATUS, AND METHOD AND PROGRAM FOR CREATING RECORD

(71) Applicant: Nidec Corporation, Kyoto (JP)

(72) Inventor: Takahiro Namikoshi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 879 days.

(21) Appl. No.: 16/273,187

(22) Filed: Feb. 12, 2019

(65) Prior Publication Data

US 2019/0271976 A1    Sep. 5, 2019

(30) Foreign Application Priority Data

Mar. 5, 2018 (JP) .............................. JP2018-038501

(51) Int. Cl.
   *G05B 23/02* (2006.01)
   *B25J 9/16* (2006.01)
   *G07C 3/04* (2006.01)

(52) U.S. Cl.
   CPC ........ *G05B 23/0264* (2013.01); *B25J 9/1653* (2013.01); *B25J 9/1674* (2013.01); *G05B 23/0221* (2013.01); *G07C 3/04* (2013.01)

(58) Field of Classification Search
   CPC ............ G05B 23/0264; G05B 23/0221; G05B 2219/35291; G05B 19/406; G05B 2219/40361; B25J 9/1653; B25J 9/1674; B25J 9/1697; B25J 19/023; B25J 9/1602; B25J 9/1628; G07C 3/04
   See application file for complete search history.

(56) References Cited

U.S. PATENT DOCUMENTS

| 9,815,203 | B1 * | 11/2017 | Stoia ..................... B25J 9/1674 |
| 9,928,487 | B2 * | 3/2018 | Kuffner, Jr. ............ G08B 21/18 |
| 10,564,031 | B1 * | 2/2020 | Stoia ....................... G01H 3/08 |
| 10,698,384 | B2 * | 6/2020 | Kobayashi ............. B25J 9/1697 |
| 10,921,776 | B2 * | 2/2021 | Hiruma .................... B25J 13/00 |
| 2004/0138783 | A1 * | 7/2004 | Watanabe .............. B25J 9/1674 700/259 |
| 2006/0214621 | A1 * | 9/2006 | Ogawa ................... B25J 9/1674 318/568.12 |
| 2014/0074286 | A1 | 3/2014 | Geheb et al. |
| 2015/0045949 | A1 * | 2/2015 | Hashiguchi .............. B25J 9/161 700/253 |

(Continued)

FOREIGN PATENT DOCUMENTS

| JP | 2014-050951 A | 3/2014 |
| JP | 2017-007036 A | 1/2017 |
| KR | 10-2017-0034752 A | 3/2017 |

OTHER PUBLICATIONS

Official Communication issued in corresponding Korean Patent Application No. 10-2019-0024659, dated Feb. 1, 2021.

*Primary Examiner* — Mohammad K Islam
(74) *Attorney, Agent, or Firm* — Keating & Bennett

(57) ABSTRACT

A robot control apparatus includes a controller to control operation of a robot, a storage to store operation logs with different preservation periods for the operation of the robot, a collector to, when a specific event occurs, select and collect an information element corresponding to a type of the event from the operation logs, a record generate to create a record from the information element collected by the collector, and a record preserver to preserve the record.

19 Claims, 5 Drawing Sheets

(56) References Cited

U.S. PATENT DOCUMENTS

| | | | |
|---|---|---|---|
| 2015/0213417 A1* | 7/2015 | Kuffner, Jr. | G08B 21/18 |
| | | | 705/305 |
| 2016/0149996 A1 | 5/2016 | Eckert et al. | |
| 2016/0214257 A1* | 7/2016 | Sejimo | B25J 9/1674 |
| 2016/0288328 A1* | 10/2016 | Bingham | G06Q 10/20 |
| 2017/0259433 A1* | 9/2017 | Takeuchi | B25J 9/1633 |
| 2018/0150051 A1* | 5/2018 | Kobayashi | B25J 9/1697 |
| 2018/0229367 A1 | 8/2018 | Lee et al. | |
| 2018/0344115 A1* | 12/2018 | Shin | A47L 11/4011 |
| 2019/0160682 A1* | 5/2019 | Sato | B25J 9/162 |
| 2019/0248006 A1* | 8/2019 | Takahashi | B25J 9/161 |
| 2019/0310606 A1* | 10/2019 | Hiruma | G06F 3/0604 |

* cited by examiner

| TYPE OF ERROR | INFORMATION ELEMENT TO BE COLLECTED |
|---|---|
| A1 | COORDINATE OF FIRST TOOL IN OPERATION LOG 18A, VOLTAGE OF MOTOR OF FIRST TOOL |
| B1 | COORDINATE OF FIRST TOOL IN OPERATION LOG 18B, VOLTAGE OF MOTOR OF FIRST TOOL |
| C1 | COORDINATE OF FIRST TOOL IN OPERATION LOG 18C, VOLTAGE OF MOTOR OF FIRST TOOL |
| D1 | COORDINATE OF SECOND TOOL IN OPERATION LOG 18A, VOLTAGE OF MOTOR OF SECOND TOOL |
| E1 | COORDINATE OF SECOND TOOL IN OPERATION LOG 18B, VOLTAGE OF MOTOR OF SECOND TOOL |
| F1 | COORDINATE OF SECOND TOOL IN OPERATION LOG 18C, VOLTAGE OF MOTOR OF SECOND TOOL |
| G1 | COORDINATE OF FIRST TOOL IN OPERATION LOG 18A, TORQUE OF MOTOR OF FIRST TOOL |
| H1 | COORDINATE OF FIRST TOOL IN OPERATION LOG 18B, TORQUE OF MOTOR OF FIRST TOOL |
| I1 | COORDINATE OF FIRST TOOL IN OPERATION LOG 18C, TORQUE OF MOTOR OF FIRST TOOL |
| J1 | COORDINATE OF SECOND TOOL IN OPERATION LOG 18A, TORQUE OF MOTOR OF SECOND TOOL |
| K1 | COORDINATE OF SECOND TOOL IN OPERATION LOG 18B, TORQUE OF MOTOR OF SECOND TOOL |
| L1 | COORDINATE OF SECOND TOOL IN OPERATION LOG 18C, TORQUE OF MOTOR OF SECOND TOOL |
| M1 | COORDINATE OF FIRST TOOL IN OPERATION LOG 18A, VOLTAGE OF MOTOR OF FIRST TOOL, TORQUE OF MOTOR OF FIRST TOOL |
| N1 | COORDINATE OF FIRST TOOL IN OPERATION LOG 18B, VOLTAGE OF MOTOR OF FIRST TOOL, TORQUE OF MOTOR OF FIRST TOOL |
| O1 | COORDINATE OF FIRST TOOL IN OPERATION LOG 18C, VOLTAGE OF MOTOR OF FIRST TOOL, TORQUE OF MOTOR OF FIRST TOOL |
| P1 | COORDINATE OF SECOND TOOL IN OPERATION LOG 18A, VOLTAGE OF MOTOR OF SECOND TOOL, TORQUE OF MOTOR OF SECOND TOOL |
| Q1 | COORDINATE OF SECOND TOOL IN OPERATION LOG 18B, VOLTAGE OF MOTOR OF SECOND TOOL, TORQUE OF MOTOR OF SECOND TOOL |
| R1 | COORDINATE OF SECOND TOOL IN OPERATION LOG 18C, VOLTAGE OF MOTOR OF SECOND TOOL, TORQUE OF MOTOR OF SECOND TOOL |
| A2 | COORDINATE OF FIRST TOOL IN OPERATION LOG 18A, VOLTAGE OF MOTOR OF FIRST TOOL; RAW VOLTAGE MEASUREMENT DATA OF MOTOR OF FIRST TOOL; RAW PICTURE DATA |
| B2 | COORDINATE OF FIRST TOOL IN OPERATION LOG 18B, VOLTAGE OF MOTOR OF FIRST TOOL; RAW VOLTAGE MEASUREMENT DATA OF MOTOR OF FIRST TOOL; RAW PICTURE DATA |
| C2 | COORDINATE OF FIRST TOOL IN OPERATION LOG 18C, VOLTAGE OF MOTOR OF FIRST TOOL; RAW VOLTAGE MEASUREMENT DATA OF MOTOR OF FIRST TOOL; RAW PICTURE DATA |
| D2 | COORDINATE OF SECOND TOOL IN OPERATION LOG 18A, VOLTAGE OF MOTOR OF SECOND TOOL; RAW VOLTAGE MEASUREMENT DATA OF MOTOR OF SECOND TOOL; RAW PICTURE DATA |

Fig.2

| TYPE OF ERROR | INFORMATION ELEMENT TO BE COLLECTED |
|---|---|
| E2 | COORDINATE OF SECOND TOOL IN OPERATION LOG 18B, VOLTAGE OF MOTOR OF SECOND TOOL; RAW VOLTAGE MEASUREMENT DATA OF MOTOR OF SECOND TOOL; RAW PICTURE DATA |
| F2 | COORDINATE OF SECOND TOOL IN OPERATION LOG 18C, VOLTAGE OF MOTOR OF SECOND TOOL; RAW VOLTAGE MEASUREMENT DATA OF MOTOR OF SECOND TOOL; RAW PICTURE DATA |
| G2 | COORDINATE OF FIRST TOOL IN OPERATION LOG 18A, TORQUE OF MOTOR OF FIRST TOOL; RAW TORQUE MEASUREMENT DATA OF MOTOR OF FIRST TOOL; RAW PICTURE DATA |
| H2 | COORDINATE OF FIRST TOOL IN OPERATION LOG 18B, TORQUE OF MOTOR OF FIRST TOOL; RAW TORQUE MEASUREMENT DATA OF MOTOR OF FIRST TOOL; RAW PICTURE DATA |
| I2 | COORDINATE OF FIRST TOOL IN OPERATION LOG 18C, TORQUE OF MOTOR OF FIRST TOOL; RAW TORQUE MEASUREMENT DATA OF MOTOR OF FIRST TOOL; RAW PICTURE DATA |
| J2 | COORDINATE OF SECOND TOOL IN OPERATION LOG 18A, TORQUE OF MOTOR OF SECOND TOOL; RAW TORQUE MEASUREMENT DATA OF MOTOR OF SECOND TOOL; RAW PICTURE DATA |
| K2 | COORDINATE OF SECOND TOOL IN OPERATION LOG 18B, TORQUE OF MOTOR OF SECOND TOOL; RAW TORQUE MEASUREMENT DATA OF MOTOR OF SECOND TOOL; RAW PICTURE DATA |
| L2 | COORDINATE OF SECOND TOOL IN OPERATION LOG 18C, TORQUE OF MOTOR OF SECOND TOOL; RAW TORQUE MEASUREMENT DATA OF MOTOR OF SECOND TOOL; RAW PICTURE DATA |
| M2 | COORDINATE OF FIRST TOOL IN OPERATION LOG 18A, VOLTAGE OF MOTOR OF FIRST TOOL, TORQUE OF MOTOR OF FIRST TOOL; RAW VOLTAGE MEASUREMENT DATA OF MOTOR OF FIRST TOOL; RAW TORQUE MEASUREMENT DATA OF MOTOR OF FIRST TOOL; RAW PICTURE DATA |
| N2 | COORDINATE OF FIRST TOOL IN OPERATION LOG 18B, VOLTAGE OF MOTOR OF FIRST TOOL, TORQUE OF MOTOR OF FIRST TOOL; RAW VOLTAGE MEASUREMENT DATA OF MOTOR OF FIRST TOOL; RAW TORQUE MEASUREMENT DATA OF MOTOR OF FIRST TOOL; RAW PICTURE DATA |
| O2 | COORDINATE OF FIRST TOOL IN OPERATION LOG 18C, VOLTAGE OF MOTOR OF FIRST TOOL, TORQUE OF MOTOR OF FIRST TOOL; RAW VOLTAGE MEASUREMENT DATA OF MOTOR OF FIRST TOOL; RAW TORQUE MEASUREMENT DATA OF MOTOR OF FIRST TOOL; RAW PICTURE DATA |
| P2 | COORDINATE OF SECOND TOOL IN OPERATION LOG 18A, VOLTAGE OF MOTOR OF SECOND TOOL, TORQUE OF MOTOR OF SECOND TOOL; RAW VOLTAGE MEASUREMENT DATA OF MOTOR OF FIRST TOOL; RAW TORQUE MEASUREMENT DATA OF MOTOR OF FIRST TOOL; RAW PICTURE DAT |
| Q2 | COORDINATE OF SECOND TOOL IN OPERATION LOG 18B, VOLTAGE OF MOTOR OF SECOND TOOL, TORQUE OF MOTOR OF SECOND TOOL; RAW VOLTAGE MEASUREMENT DATA OF MOTOR OF FIRST TOOL; RAW TORQUE MEASUREMENT DATA OF MOTOR OF FIRST TOOL; RAW PICTURE DATA |
| R2 | COORDINATE OF SECOND TOOL IN OPERATION LOG 18C, VOLTAGE OF MOTOR OF SECOND TOOL, TORQUE OF MOTOR OF SECOND TOOL; RAW VOLTAGE MEASUREMENT DATA OF MOTOR OF FIRST TOOL; RAW TORQUE MEASUREMENT DATA OF MOTOR OF FIRST TOOL; RAW PICTURE DATA |

Fig.3

| TYPE OF ERROR | INFORMATION ELEMENT TO BE COLLECTED |
|---|---|
| A11 | COORDINATE OF FIRST TOOL OF 50 MS PERIOD IN OPERATION LOG 18C, VOLTAGE OF MOTOR OF FIRST TOOL |
| A12 | COORDINATE OF FIRST TOOL OF 100 MS PERIOD IN OPERATION LOG 18C, VOLTAGE OF MOTOR OF FIRST TOOL |
| A13 | COORDINATE OF FIRST TOOL OF 1000 MS PERIOD IN OPERATION LOG 18C, VOLTAGE OF MOTOR OF FIRST TOOL |
| A14 | COORDINATE OF FIRST TOOL OF 50 MS PERIOD IN OPERATION LOG 18C, TORQUE OF MOTOR OF FIRST TOOL |
| A15 | COORDINATE OF FIRST TOOL OF 100 MS PERIOD IN OPERATION LOG 18C, TORQUE OF MOTOR OF FIRST TOOL |
| A16 | COORDINATE OF FIRST TOOL OF 1000 MS PERIOD IN OPERATION LOG 18C, TORQUE OF MOTOR OF FIRST TOOL |
| A17 | COORDINATE OF FIRST TOOL OF 50 MS PERIOD IN OPERATION LOG 18C, VOLTAGE OF MOTOR OF FIRST TOOL; TORQUE OF FIRST TOOL OF 100 MS PERIOD IN OPERATION LOG 18C |
| A18 | COORDINATE OF SECOND TOOL OF 50 MS PERIOD IN OPERATION LOG 18C, VOLTAGE OF MOTOR OF SECOND TOOL |
| A19 | COORDINATE OF SECOND TOOL OF 100 MS PERIOD IN OPERATION LOG 18C, VOLTAGE OF MOTOR OF SECOND TOOL |
| A20 | COORDINATE OF SECOND TOOL OF 1000 MS PERIOD IN OPERATION LOG 18C, VOLTAGE OF MOTOR OF SECOND TOOL |
| A21 | COORDINATE OF SECOND TOOL OF 50 MS PERIOD IN OPERATION LOG 18C, TORQUE OF MOTOR OF SECOND TOOL |
| A22 | COORDINATE OF SECOND TOOL OF 100 MS PERIOD IN OPERATION LOG 18C, TORQUE OF MOTOR OF SECOND TOOL |
| A23 | COORDINATE OF SECOND TOOL OF 1000 MS PERIOD IN OPERATION LOG 18C, TORQUE OF MOTOR OF SECOND TOOL |
| A24 | COORDINATE OF SECOND TOOL OF 50 MS PERIOD IN OPERATION LOG 18C, VOLTAGE OF MOTOR OF SECOND TOOL; TORQUE OF SECOND TOOL OF 100 MS PERIOD IN OPERATION 18C 100 MS PERIOD IN OPERATION 18C |
| A25 | COORDINATE OF SECOND TOOL OF 50 MS PERIOD IN OPERATION LOG 18C, VOLTAGE OF MOTOR OF SECOND TOOL; TORQUE OF SECOND TOOL OF 100 MS PERIOD IN OPERATION 18C |
| A26 | COORDINATE OF SECOND TOOL OF 50 MS PERIOD IN OPERATION LOG 18C, VOLTAGE OF MOTOR OF SECOND TOOL; TORQUE OF SECOND TOOL OF 200 MS PERIOD IN OPERATION 18C |
| A27 | COORDINATE OF FIRST TOOL OF 50 MS PERIOD IN OPERATION LOG 18C, VOLTAGE OF MOTOR OF FIRST TOOL; COORDINATE OF SECOND TOOL OF 100 MS PERIOD IN OPERATION LOG 18C, VOLTAGE OF MOTOR OF SECOND TOOL |

Fig.4

ROBOT CONTROL APPARATUS, AND METHOD AND PROGRAM FOR CREATING RECORD

CROSS REFERENCE TO RELATED APPLICATIONS

This application claims the benefit of priority to Japanese Patent Application No. 2018-038501 filed on Mar. 5, 2018. The entire contents of this application are hereby incorporated herein by reference.

BACKGROUND OF THE INVENTION

1. Field of the Invention

The present disclosure relates to a robot control apparatus, and a method and program for creating records.

2. Description of the Related Art

A robot used in a production line of a factory preserves an operation history or an error history in a log file in order to interpret a cause or transmits the operation history or the error history to a dedicated data server when a problem, such as production line suspension, occurs. Japanese Patent Application Laid-Open No. 2016-100026 discloses a technique for collecting data from each of a plurality of robots in real time and transferring the collected data.

In a conventional technology, however, the amount of data preserved is enormous because data is collected from each robot in real time. On the other hand, when the amount of date preserved is too small, an error cause cannot be sufficiently analyzed.

SUMMARY OF THE INVENTION

According to an example embodiment of the present disclosure, a robot control apparatus includes a controller to control operation of a robot, a storage to store a plurality of operation logs with different preservation periods for the operation of the robot, a collector to, when a specific event occurs, select and collect an information element corresponding to a type of the event from the plurality of operation logs, a record generator to create a record from the information element collected by the collector, and a record preserver to preserve the record.

According to an example embodiment of the present disclosure, a method of creating a record includes selecting an information element corresponding to a type of a specific event from a plurality of operation logs that are included in a storage and that have different preservation periods with respect to operation of a robot when the event occurs. The method includes collecting the selected information element, creating a record from the collected information element, and preserving the record.

According to an example embodiment of the present disclosure, a non-transitory computer-readable medium includes a program enabling a computer to execute functions including selecting an information element corresponding to a type of a specific event from a plurality of operation logs that are included in a storage and that have different preservation periods with respect to operation of a robot when the event occurs, collecting the selected information element, creating a record from the collected information element, and preserving the record.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 2 is a schematic diagram showing an example of the contents of an error operation table used in the robot control apparatus.

FIG. 3, which is a continuation of FIG. 2, is a schematic diagram showing an example of the contents of the error operation table.

FIG. 4 is a schematic diagram showing another example of the contents of the error operation table used in the robot control apparatus.

DETAILED DESCRIPTION OF THE PREFERRED EMBODIMENTS

Hereinafter, embodiments of the present disclosure will be described with reference to the accompanying drawings.

<Configuration of Robot Control Apparatus>

Figure 1:
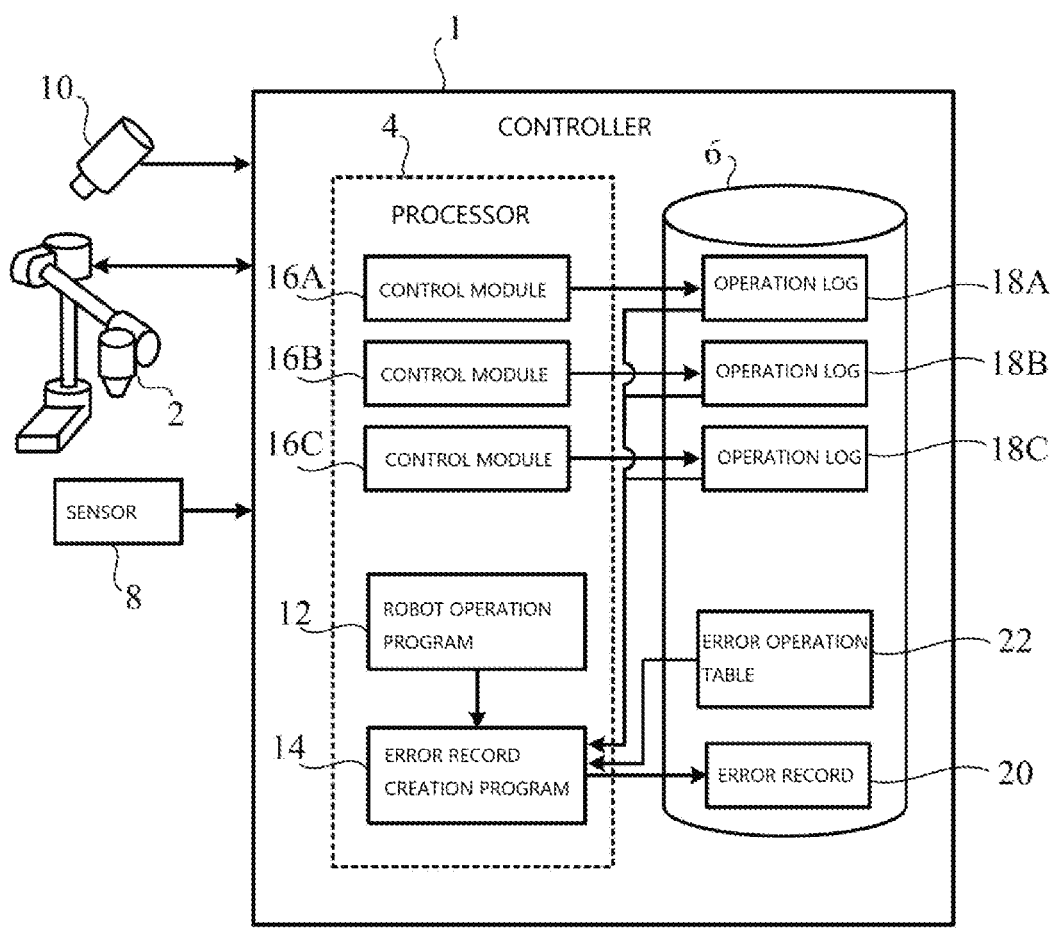
FIG. 1 is a block diagram showing a configuration of a robot control apparatus according to an embodiment of the present disclosure.

FIG. 1 is a block diagram showing a configuration of a controller 1 of a robot control apparatus according to an embodiment of the present disclosure. According to this embodiment, the controller 1 controls and monitors a robot 2. The robot 2 is a manufacturing robot in a factory, for example, a multi-joint robot. That is, the robot 2 is not limited to being a multi-joint robot, but may be a numerical control machine tool for automatically performing work, for example, a numerical control lathe or a numerical control machining center. Also, the robot 2 is not limited to being a manufacturing robot, but may include a carrier robot, an autonomous mobile robot, and other robots.

The controller 1 has a processor 4 and a memory 6 (a storage unit). The processor 4 is, for example, a central processing unit (CPU) and executes various programs stored in the memory 6 to perform various functional operations. The memory 6 may be, for example, an electrically erasable programmable read-only memory (EEPROM) and contains various data and programs used by the processor 4.

The controller 1 may be mounted on the robot 2 or may be installed separately from a processor mounted on the robot 2 to communicate with the processor mounted on the robot 2 in a wired or wireless manner. Also, the controller 1 may have the processor 4 mounted on the robot 2 and the memory 6 installed outside the robot 2.

Various sensors 8 are connected to the controller 1. In FIG. 1, only one sensor 8 is shown, but a plurality of sensors 8 may be connected to the controller 1. The sensors 8 supply, to the controller 1, measurement data indicating a voltage given to an actuator (e.g., a motor) disposed in a predetermined position, measurement data indicating a force or torque exerted by an actuator, measurement data indicating an angle of an actuator, measurement data indicating a rate of an actuator, and measurement data indicating a temperature in the form of an electric signal. The sensor 8 may be disposed inside or outside the robot 2.

A camera 10 configured to capture the robot 2 is connected to the controller 1 and supplies, to the controller 1, picture data indicating behavior of the robot 2 obtained from the capturing in the form of an electric signal. The camera 10 may capture a video. The camera 10 may have a depth sensor. In this case, the camera 10 supplies depth measurement data indicating positions of various parts of the robot 2 to the controller 1 in the form of an electric signal.

The memory 6 contains, as the program, a robot operation program 12 for controlling operation of the robot 2, a system control program for collectively controlling operation of the processor 4, and an error record creation program 14. In FIG. 1, for convenience of description, the robot operation program 12 and the error record creation program 14 are shown inside the processor 4.

Also, in FIG. 1, for convenience of description, control modules 16A, 16B, and 16C are shown inside the processor 4. Each of the control modules 16A, 16B, and 16C is a module or subroutine, which is a portion of the system control program, and indicates a task executed by the processor 4. In detail, the control modules 16A, 16B, and 16C generate operation logs 18A, 18B, and 18C indicating histories about the operation of the robot 2 and display tasks for preserving the operation logs 18A, 18B, and 18C in the memory 6.

The processor 4 may operate properly by reading the system control program from the memory 6 and executing the read system control program. Also, the processor 4 generates the operation logs 18A, 18B, and 18C according to the control modules 16A, 16B, and 16C and preserves the operation logs 18A, 18B, and 18C in the memory 6.

The operation logs 18A, 18B, and 18C have difference preservation periods. For example, the operation log 18A has a preservation period of one week, the operation log 18B has a preservation period of one day, and the operation log 18C has a preservation period of two hours. The processor 4 updates the contents of the operation logs 18A, 18B, and 18C by adding information elements to the operation logs 18A, 18B, and 18C in sequence according to the control modules 16A, 16B, and 16C and also updates the contents of the operation logs 18A, 18B, and 18C by deleting an information element for which a predetermined preservation period has elapsed.

The information elements of the operation logs 18A, 18B, and 18C may be, for example, a coordinate of a predetermined position of the robot 2, a voltage given to an actuator (e.g., a motor) placed at a predetermined position of the robot 2, a force or torque exerted by an actuator, a temperature of the robot 2, or the like. The information elements may be obtained from the plurality of sensors 8. The information elements of the operation logs 18A, 18B, and 18C may be in a text form, which may be read and understood by a person.

By reading a robot operation program 12 from the memory 6 and executing the robot operation program 12, the processor 4 functions as a control unit for controlling the operation of the robot 2 and instructs the robot 2 to execute a required task.

Since the operation logs 18A, 18B, and 18C preserved in the memory 6 indicate a history about the operation of the robot 2, an interpreter of the operation logs 18A, 18B, and 18C may track a behavior history of the robot 2 by using the operation logs 18A, 18B, and 18C and then specify a cause of an error when the error occurs in the robot 2. However, the preservation periods of the operation logs 18A, 18B, and 18C are limited, and the storage contents of the operation log 18A do not have an information element prior to occurrence of an error one week after the error occurs.

Accordingly, by reading an error record creation program from the memory 6 and executing the error record creation program 14, the processor 4 creates an error record 20 related to an error separately from the operation logs 18A, 18B, and 18C when the error occurs. In detail, when an error occurs in the operation logs 18A, 18B, and 18C, the processor 4 functions as a collection unit configured to select and collect an information element corresponding to the type of the error according to the error record creation program 14. Also, according to the error record creation program 14, the processor 4 functions as a record creation unit for creating the error record 20 from the information element collected by the collection unit. Also, according to the error record creation program 14, the processor 4 (the record preservation unit) functions as a record preservation unit for preserving the error record 20 in the memory 6.

An error operation table 22 is contained in the memory 6. The error operation table 22 describes a plurality of error types and one or more types of information elements which are associated with each of the error types. When an error occurs in the robot 2, the processor 4 determines the type of the error and selects and collects an information element according to the error types described in the error operation table 22 with reference to the error operation table 22.

<Contents of Error Operation Table>

FIGS. 2 and 3 show an example of the contents of the error operation table 22. For example, when an A1-type error shown in FIG. 2 occurs, the processor 4 selects and collects, from the operation log 18A, an information element of a coordinate of a first tool of the robot 2 and an information element of a voltage given to a motor for driving the first tool and then creates an error record 20 having the information elements. The A1-type error shown in FIG. 2 is an error that occurs after a relatively long period predicted in association with the first tool (e.g., an error caused due to wear of parts of a robot or looseness of fastening of parts).

When an A2-type error occurs, the processor 4 selects and collects, from the operation log 18B, an information element of a coordinate of a first tool of the robot 2 and an information element of a voltage given to a motor for driving the first tool and then creates an error record 20 having the information elements. The A2-type error is an error that occurs after a period of approximately one day predicted in association with the first tool (e.g., an error caused due to reduction of lubricant of a robot).

When an A3-type error occurs, the processor 4 selects and collects, from the operation log 18C, an information element of a coordinate of a first tool of the robot 2 and an information element of a voltage given to a motor for driving the first tool and then creates an error record 20 having the information elements. The A3-type error is an error that occurs after a short period predicted in association with the first tool (e.g., an error caused due to change in temperature of a robot).

For example, when an A2-type error shown in FIG. 2 occurs, the processor 4 selects and collects, from the operation log 18A, an information element of a coordinate of a first tool of the robot 2 and an information element of a voltage given to a motor for driving the first tool, as in the case where the A1-type error occurs. Also, the processor 4 adds raw voltage measurement data given to the motor for driving the first tool supplied from the sensor 8 immediately before the error occurs (e.g., a period of 10000 ms) and raw data of a video of the robot 2 supplied from the camera 10 immediately before the error occurs (e.g., a period of 10000 ms) to the information elements and then creates an error record 20 having the information elements and the raw data.

When a J2-type error shown in FIG. 3 occurs, the processor 4 selects and collects, from the operation log 18A, an information element of a coordinate of a second tool of the robot 2 and an information element of a torque exerted by a motor for driving the second tool, as in the case where a J1-type error occurs (FIG. 2). Also, the processor 4 adds raw torque measurement data exerted by the motor for driving the second tool supplied from the sensor 8 immediately before the error occurs (e.g., a period of 10000 ms) and raw data of a video of the robot 2 supplied from the camera 10 immediately before the error occurs (e.g., a period of 10000 ms) to the information elements and then creates an error record 20 having the information elements and the raw data.

Here, the raw data is binary data that may be read by a machine. Picture data that is a source from which the error record 20 is created may be data of a video before the error occurs as described above or may be data of a still image (a snapshot) captured by the camera 10, the capturing being triggered by the occurrence of the error.

The processor 4 may create an error record 20 having temperature measurement data by adding raw temperature measurement data supplied from the sensor 8 when an error occurs in the robot 2 to the information elements. As described above, the temperature may be included in the information elements of the operation logs 18A, 18B, and 18C but may be excluded from the information elements of the operation logs 18A, 18B, and 18C.

When the camera 10 has a depth sensor, the processor 4 may create an error record 20 having temperature measurement data by adding raw depth measurement data supplied from the camera 10 when an error occurs in the robot 2 to the information elements.

FIG. 4 shows another example of the contents of the error operation table 22. As shown in FIG. 4, the processor 4 may select and collect an information element that is periodically recorded from any one of the operation logs 18A, 18B, and 18C.

Also, the processor 4 may select and collect, from the same operation log, an information element recorded in a first period and a different type of information element recorded in a second period different from the first period. For example, when an A17-type error shown in FIG. 4 occurs, the processor 4 selects and collects information elements of a coordinate of a first tool recorded in the operation log 18C in a period of 50 ms, a voltage given to a motor for driving a first tool recorded in the operation log 18C in a period of 50 ms, and a torque exerted by a motor for driving a first tool recorded in the operation log 18C in a period of 100 ms and then creates an error record 20 having the information elements. When an A27-type error occurs, the processor 4 selects and collects information elements of a coordinate of a first tool recorded in the operation log 18C in a period of 50 ms, a voltage given to a motor for driving a first tool recorded in the operation log 18C in a period of 50 ms, a coordinate of a second tool recorded in the operation log 18C in a period of 100 ms, and a voltage given to a motor for driving a second tool recorded in the operation log 18C in a period 100 ms and then creates an error record 20 having the information elements.

FIG. 4 does not show raw data as an information element to be collected, but although the error operation table 22 is used, the processor 4 may add an information element of an operation log and then create an error record 20 having the raw data.

The processor 4 may select and collect, from the operation logs 18A, 18B, and 18C, an information element corresponding to the entire preservation period among information elements designated by the error operation table 22. However, the processor 4 may select and collect an information element recorded a certain period after the error occurs among the information elements designated by the error operation table 22.

<Error Record Creation Operation>

Figure 5:
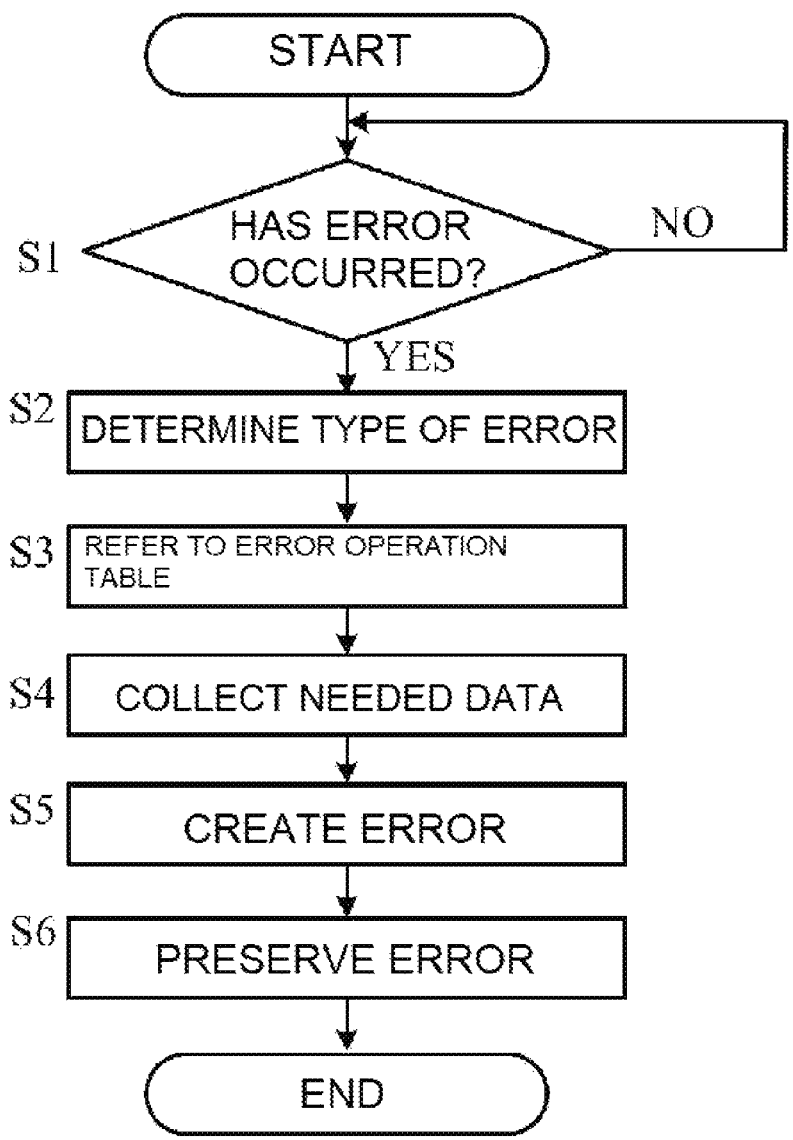
FIG. 5 is a flowchart showing a method of creating a record in the robot control apparatus according to an embodiment of the present disclosure.

FIG. 5 is a flowchart showing a method of creating a record in the robot control apparatus according to an embodiment of the present disclosure. This method is performed by the processor 4 according to the error record creation program 14.

When an error occurs in the robot 2, the determination in step S1 is positive, and the processing proceeds to step S2. In step S2, the processor 4 determines the type of the error that has occurred.

Subsequently, in step S3, the processor 4 finds an information element to be collected according to the type of the error determined in step S2 according to, and with reference to, the error operation table 22. As described above, the information element to be collected includes an information element recorded in at least one of the operation logs 18A, 18B, and 18C, and other data.

Subsequently, in step S4, the processor 4 selects and collects the information element found in step S3. Also, in step S5, from the collected information elements, the processor 4 creates an error record 20 having the elements. Also, in step S6, the processor 4 preserves a compressed-format error record 20 obtained by compressing the error record 20 in the memory 6. Then, the processing ends.

When an error occurs in the robot 2, generally, the robot operation program 12 stops, and thus a processing burden of the processor 4 does not increase significantly although steps S2 to S6 are performed.

As described above, in the present embodiment, the processor 4 may create an error record 20 including only information related to an error that has occurred by selecting and collecting an information element corresponding to the type of error among the plurality of operation logs 18A, 18B, and 18C. The error record 20 may be preserved separately from the plurality of operation logs 18A, 18B, and 18C already stored and may help interpret information related to the error. Also, since the error record 20 includes only the information related to the error that has occurred, it is possible to reduce the amount of data preserved.

The processor 4 may select an information element from any one of the plurality of operation logs 18A, 18B, and 18C according to the type of the event that has occurred. For example, the processor 4 may select a required information element from the operation log 18C, which has a short preservation period and is predicted to be directly associated with the error, according to the type of the error. Alternatively, the processor 4 may select a required information element from the operation log 18A, which has a long preservation period and is predicted to be indirectly associated with the error. Also, the processor 4 may select a required information element from the operation log 18C, which has a short preservation period, with respect to an error occurring after a short period and may select a required information element from the operation log 18A, which has a long preservation period, with respect to an error occurring after a long period.

As described above, the processor 4 may select, from the same operation log, an information element recorded in a first period and a different type of information element recorded in a second period different from the first period. The error of the robot 2 may occur due to complex factors. Recording, in the error record 20, different types of information elements recorded in different periods may be helpful in interpreting the error of the robot 2.

When an event occurs, the processor 4 may create a record by adding raw picture data supplied from a camera for monitoring the robot 2 and/or raw data supplied from the sensor 8 for monitoring the robot 2 to the information elements. Recording the raw data in the error record 20 may be helpful in interpreting the error of the robot 2.

The processor 4 may create an error record 20 by adding the robot operation program 12 to the information elements when an error occurs in the robot 2. In this case, when an error occurs, the processor 4 may create the error record 20 by adding an indicator (e.g., a row number) indicating a row executed in the robot operation program 12 at the time of the occurrence of the error to the information elements. The system control program used in the controller 1 may be common to different controllers 1, and the robot operation program 12 may be prepared for each controller 1 and may also be individually changed by a user of the robot 2. That is, an interpreter of the error record 20 may not know the robot operation program 12 despite knowing the system control program. Even in such a case, recording, in the error record 20, the robot operation program 12 used by the controller and the indicator indicating the row executed in the robot operation program 12 at the time of the occurrence of the error may be helpful in finding a cause of the error because a situation upon the occurrence of the error is explained.

For example, it is assumed that a torque error has occurred in a motor for driving a tool including the robot 2. The torque error occurs when the motor is overloaded. The following causes are considered.

The tool hit the wall or base material because of incorrect operation coordinates.

The tool hit an object that was not present before has been placed.

An unexpected external force was applied to the tool (e.g., a cable or cord was tangled, someone forced to stop the tool, etc.).

The motor failed.

In order to interpret the torque error of the motor later, the following detailed information may be obtained.

Which individual operation of which operation program was performed?

Tip coordinates of the robot upon the occurrence of the error

A motor angle of each joint, a speed before the error, and a torque value.

A picture of the robot obtained through a camera

An adjustment value given to the motor and the sensor.

Default information regarding the robot.

Accordingly, when a torque error occurs, the processor 4 may select and collect, from the operation log, which is predicted to be associated with the torque error, for example, which has a short period, an information element of coordinates of one or more associated tools, a voltage given to a motor for driving the one or more associated tools, measurement data indicating an angle of the motor, and measurement data indicating a speed of the motor. Also, the processor 4 adds, to the information elements, raw voltage measurement data given to the motor for driving the one or more associated tools supplied from the sensor 8 immediately before the error occurs (e.g., a period of 10000 ms) and raw data of a video of the robot 2 supplied from the camera 10 immediately before the error occurs (e.g., a period of 10000 ms). The processor 4 creates an error record 20 by adding the robot operation program 12 and the indicator indicating a row executed upon the occurrence of the error to the information elements. Adjustment values given to the motor and the sensor and the default information regarding the robot may be included in the error record 20.

According to a command transmitted to the processor 4 from an external apparatus (e.g., a command apparatus not shown) connected to the controller 1 and capable of communicating with the processor 4, as well as the robot operation program 12, the processor 4 may instruct the robot 2 to execute work. In this case, when an error occurs in the robot 2 during the operation corresponding to the command, the processor 4 creates an error record 20 by adding the command to the information elements. An interpreter of the error record 20 may not know the command given to the processor 4 from an external apparatus. Recording the command (i.e., a command that may have causes the error) referenced by the processor 4 at the time of the occurrence of the error in the error record 20 may be helpful in finding a cause of the error because a situation upon the occurrence of the error is explained.

The processor 4 may compress the error record 20 and preserve a compressed-format error record 20 in the memory 6. Due to the compression, it is possible to reduce the amount of data of the error record 20.

The error record 20 is preserved over a long period (e.g., one month or one year). The error record 20 may be permanently preserved. When the controller 1 is located at a remote place, an interpreter of the error record 20 goes to the remote place and tracks a behavior history of the robot 2 using the error record 20 to, for example, specify a cause of the error.

Although not shown, the controller 1 may be connected to a management apparatus via a network (e.g., the Internet). In this case, the processor 4 may transmit the error record 20 to the management apparatus in a compressed format. In this case, without needing to go to the place where the controller 1 is present, the interpreter may track the behavior history of the robot 2 using the error record 20 to, for example, specify a cause of the error.

Although the embodiment of the present disclosure has been described above, the above description does not limit the present disclosure, and various modifications including deletion, addition, and substitution of elements are considered within the technical scope of the present disclosure.

For example, according to the above embodiment, when an error occurs in the robot 2, the error record 20 is created. However, the present disclosure is not limited to the creation of the error record. That is, when a specific event occurs, the processor 4 may select and collect an information element corresponding to the type of the event from a plurality of operation logs and may create and preserve a record from the collected information element. The specific event may include, for example, a predetermined period of time having passed, a user or interpreter giving a specific trigger to the controller 1, and/or the robot 2 achieving a specific operation.

According to the above embodiment, the system control program, the robot operation program 12, the error record creation program 14, the operation logs 18A, 18B, and 18C, the error record 20, and the error operation table 22 are contained in one memory 6. However, the components may be contained in different memories.

The number of control modules 16A, 16B, and 16C of the system control program is not limited to three and may be two or four or more. Also, the number of operation logs 18A, 18B, and 18C is not limited to three and may be two or four or more.

In the controller 1, each function executed by the processor 4 may be executed by a hardware device, instead of a processor, and may be executed by, for example, a programmable logic device such as a field programmable gate array (FPGA), a digital signal processor (DSP), and the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A robot control apparatus comprising:
    a controller to control operation of a robot;
    a storage to store a plurality of operation logs with different preservation periods for the operation of the robot;
    a collector to, when specific errors in an operation of the robot occur, select and collect multiple information elements from the plurality of operation logs, the multiple information elements corresponding to different ones of types of the specific errors that have occurred among multiple types of errors;
    a record generator to create a record from only the multiple information elements collected by the collector corresponding to one of the specific errors which has been detected as occurring; and
    a record preserver to preserve the record; wherein
    the multiple information elements include at least one of coordinates a voltage, a torque, picture data, voltage measurement data, and torque data.

2. The robot control apparatus of claim 1, wherein the collector selects the multiple information elements from any one of the plurality of operation logs according to the type of the error that has occurred.

3. The robot control apparatus of claim 1, wherein the collector selects, from the same operation log, an information element of the multiple information elements recorded in a first period and selects an information element of the multiple information elements recorded in a second period different from the first period.

4. The robot control apparatus of claim 1, wherein when the error occurs, the collector adds raw picture data, which is supplied from a camera to monitor the robot, to at least one corresponding one of the multiple information elements.

5. The robot control apparatus of claim 1, wherein when the specific errors occur, the collector adds raw data supplied from a sensor to monitor the robot to the multiple information elements.

6. The robot control apparatus of claim 1, wherein when the specific errors occur, the collector adds a robot operation program to operate the controller to the multiple information elements.

7. The robot control apparatus of claim 6, wherein when the errors occur, the record generator adds an indicator indicating a row executed in the robot operation program at a time of the occurrence of the specific errors to the multiple information elements.

8. The robot control apparatus of claim 1, wherein
    the controller controls the operation of the robot according to a command transmitted from an external apparatus to the controller; and
    the collector adds the command to the multiple information elements when the specific errors occur while the operation corresponding to the command is performed.

9. The robot control apparatus of claim 1, wherein the record preserver compresses and preserves the record.

10. The robot control apparatus of claim 1, wherein
    the controller stops the robot when the specific errors occur in the operation of the robot.

11. The robot control apparatus of claim 1, wherein
    multiple different sensors respectively produce the multiple information elements.

12. The robot control apparatus of claim 11, wherein
    data output from the multiple different sensors are saved in multiple different ones of the plurality of operation logs.

13. The robot control apparatus of claim 11, wherein
    the multiple different sensors include a camera, a temperature sensor, a torque sensor, and a voltage sensor.

14. The robot control apparatus of claim 1, wherein
    the multiple information elements include data which is recorded at different time periods.

15. The robot control apparatus of claim 1, wherein the record includes only portions of data of the multiple information elements corresponding to the error which occurred which relate to a predetermined time period.

16. A method of creating a record, the method comprising:
    selecting, from a storage, multiple information elements respectively corresponding to different ones of types of specific errors that have occurred among multiple types of errors in an operation of a robot from a plurality of operation logs that are included in the storage and that have different preservation periods with respect to operation of the robot when an error occurs;
    collecting the multiple information elements corresponding to the error which occurred;
    creating a record from only the multiple information elements corresponding to the error which occurred; and
    preserving the record; wherein
    the multiple information elements include at least one of coordinates, a voltage, a torque, picture data, voltage measurement data, and torque data.

17. The method of creating a record of claim 16, wherein the record includes only portions of data of the multiple information elements corresponding to the error which occurred which relate to a predetermined time period.

18. A non-transitory computer-readable medium including a program enabling a computer to execute functions comprising:
    selecting, from a storage, multiple information elements respectively corresponding to different ones of types of specific errors that have occurred among multiple types of errors in an operation of a robot from a plurality of operation logs that are included in the storage and that have different preservation periods with respect to operation of the robot when an error occurs;
    collecting the multiple information elements corresponding to the error which occurred;
    creating a record from only the multiple information elements corresponding to the error which occurred; and
    preserving the record; wherein
    the multiple information elements include at least one of coordinates, a voltage, a torque, picture data, voltage measurement data, and torque data.

19. The non-transitory computer-readable medium including a program enabling a computer to execute functions of claim 18, wherein the record includes only portions of data of the multiple information elements corresponding to the error which occurred which relate to a predetermined time period.

\* \* \* \* \*